United States Patent
Nield et al.

(10) Patent No.: US 10,035,687 B2
(45) Date of Patent: Jul. 31, 2018

(54) BRAKING SYSTEM FOR A DRAW WORKS USED FOR DRILLING OPERATIONS

(71) Applicants: Barry J. Nield, Greenville, SC (US); G. Alexander Nield, Pasadena, CA (US)

(72) Inventors: Barry J. Nield, Greenville, SC (US); G. Alexander Nield, Pasadena, CA (US)

( * ) Notice: Subject to any disclaimer, the term of this patent is extended or adjusted under 35 U.S.C. 154(b) by 76 days.

(21) Appl. No.: 14/829,713

(22) Filed: Aug. 19, 2015

(65) Prior Publication Data
US 2017/0050827 A1 Feb. 23, 2017

(51) Int. Cl.
| | | |
|---|---|---|
| F16D 49/00 | (2006.01) | |
| B66D 5/00 | (2006.01) | |
| B66D 5/26 | (2006.01) | |
| B66D 5/08 | (2006.01) | |
| F16D 49/10 | (2006.01) | |
| F16D 49/12 | (2006.01) | |
| B66D 5/10 | (2006.01) | |
| F16D 121/02 | (2012.01) | |
| F16D 121/14 | (2012.01) | |

(52) U.S. Cl.
CPC .............. *B66D 5/26* (2013.01); *B66D 5/08* (2013.01); *B66D 5/10* (2013.01); *F16D 49/10* (2013.01); *F16D 49/12* (2013.01); *F16D 2121/02* (2013.01); *F16D 2121/14* (2013.01)

(58) Field of Classification Search
CPC .......... F16D 49/00; F16D 49/10; F16D 49/12; B66D 5/26
See application file for complete search history.

(56) References Cited

U.S. PATENT DOCUMENTS

| | | | | |
|---|---|---|---|---|
| 1,711,886 A | * | 5/1929 | Ginter | E21B 19/008 188/204 A |
| 1,833,167 A | * | 11/1931 | St Clair | B66D 5/26 188/151 R |
| 1,932,685 A | * | 10/1933 | Black | E21B 19/008 188/151 R |
| 2,009,889 A | * | 7/1935 | Hild | B66C 13/23 192/114 R |
| 2,042,112 A | * | 5/1936 | Lynn | B60T 15/048 244/111 |
| 2,085,040 A | * | 6/1937 | Post | B66D 5/26 188/110 |

(Continued)

*Primary Examiner* — Bradley T King
*Assistant Examiner* — James K Hsiao
(74) *Attorney, Agent, or Firm* — SteveLeBlancLLC

(57) ABSTRACT

A braking system may include a brake assembly having a brake shaft and a brake lever coupled to the brake shaft. The system may also include a brake cylinder having a first chamber, a second chamber, a piston positioned between the chambers and a piston rod extending outwardly from the piston. The piston rod may be configured to be coupled to the brake shaft such that movement of the piston rod results in rotation of the brake shaft. In addition, the system may include a first valve configured to control a supply of working fluid to the first chamber and a second valve configured to control a supply of the working fluid to the second chamber. By adjusting a position of the first valve and/or the second valve, a braking force applied between the brake assembly and a drum of the draw works may be controlled.

18 Claims, 4 Drawing Sheets

(56) References Cited

U.S. PATENT DOCUMENTS

| | | | | |
|---|---|---|---|---|
| 2,282,615 A | * | 5/1942 | Spalding | F16D 49/12 188/105 |
| 2,465,164 A | * | 3/1949 | Maier | B66D 5/26 188/151 R |
| 2,489,449 A | * | 11/1949 | Crookston | B66D 5/26 173/5 |
| 2,545,136 A | * | 3/1951 | Crookston | B66D 5/26 188/105 |
| 2,569,479 A | * | 10/1951 | Lonngren | F16D 49/08 188/105 |
| 2,589,059 A | * | 3/1952 | Crookston | B66D 5/26 188/151 R |
| 2,658,589 A | * | 11/1953 | Ashton | B66D 5/00 188/105 |
| 2,928,505 A | * | 3/1960 | Wilson | B66D 5/26 188/151 R |
| 2,992,707 A | * | 7/1961 | Lewis | F16D 49/08 188/251 R |
| 3,244,404 A | * | 4/1966 | Bender | B66D 1/26 188/204 R |
| 3,627,084 A | * | 12/1971 | Benedek | F16D 65/16 188/105 |
| 4,043,434 A | * | 8/1977 | Braschler | F16D 57/04 188/296 |
| 4,168,768 A | * | 9/1979 | Johnson | B66D 5/26 188/204 A |
| 4,699,377 A | | 9/1987 | Richardson et al. | |
| 5,042,317 A | | 8/1991 | Malara | |
| 5,159,996 A | * | 11/1992 | LeBlanc | B66D 5/08 188/105 |
| 5,269,098 A | | 12/1993 | Redman | |
| 5,313,892 A | | 5/1994 | Tice | |
| 6,705,436 B2 | | 3/2004 | Noll et al. | |
| 6,745,487 B1 | | 6/2004 | Nield | |
| 7,138,925 B2 | | 11/2006 | Nield | |
| 7,513,338 B2 | * | 4/2009 | Newman | B60T 7/10 188/204 A |
| 7,559,411 B2 | | 7/2009 | Michel et al. | |
| 8,499,901 B2 | * | 8/2013 | Jenkins | B60T 7/102 188/318 |
| 2003/0015380 A1 | | 1/2003 | Skyes et al. | |
| 2004/0099784 A1 | | 5/2004 | Kienholz | |
| 2006/0053953 A1 | | 3/2006 | Choi | |
| 2008/0277214 A1 | | 11/2008 | Chang | |
| 2011/0174538 A1 | | 7/2011 | Chan | |
| 2013/0175123 A1 | | 7/2013 | Nield | |

\* cited by examiner

BRAKING SYSTEM FOR A DRAW WORKS USED FOR DRILLING OPERATIONS

FIELD OF THE INVENTION

The present subject matter relates generally to drilling rigs and, more particularly, to a braking system for a draw works or hoist used in connection with a drilling rig for performing drilling operations.

BACKGROUND OF THE INVENTION

Drilling rigs often include a machine known as a draw works or hoist for raising and lowering piping and drill bits. A typical draw works includes a drill line wound around a large drum or spool. The drill line extends from the drum through a pulley or other block and tackle arrangement to a travelling block. A, drive system rotates the drum to reel in the drill line and a brake lever may be manually operated to apply or release one or more component of a brake assembly connected to the drum. For example, the brake lever may be positioned to manually release the brake assembly to allow the drive system to rotate the drum to reel in the drill line and raise the travelling block. Alternately, the drive system may be disconnected from the drum, and the brake lever may be positioned to manually release the brake assembly to allow the weight of the travelling block to rotate the drum to release drill line from the drum and lower the travelling block.

Unfortunately, conventional braking systems for draw works have many disadvantages. For example, the manually operated brake lever is often difficult to actuate or rotate (particularly with heavy loads), thereby increasing operator fatigue. In addition, the typical practice is to use a heavy chain to hold the brake lever in its engaged position when the operator leaves his/her station to ensure that the brake assembly remains engaged. However, if the chain is not properly installed, the brake lever may release, thereby disengaging the brake. Moreover, in some instances, the brake assembly and the drum flange may be extremely hot due to constant use of the brake. In such instances, as the brake assembly cools, one or more of the components of the brake assembly may contract and no longer maintain contact with the other brake assembly components, which may cause the brake to become disengaged. As is generally understood, given the heavy loads typically accommodated by a draw works, any unintentional release of the braking system has the potential to cause significant damage to the drilling rig (and/or its associated components) and/or injury to nearby personnel.

Accordingly, an improved braking system for a draw works used in connection with a drilling rig would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a braking system for a draw works used in connection with a drilling rig. The system may include a brake assembly having a rotatable brake shaft and a brake lever mechanically coupled to the brake shaft. The system may also include a brake cylinder having a first chamber, a second chamber and a piston positioned between the first and second chambers. The brake cylinder may also include a piston rod extending outwardly from the piston. The piston rod may be configured to be mechanically coupled to the brake shaft such that movement of the piston rod results in rotation of the brake shaft. In addition, the system may include a first valve provided in fluid communication with the first chamber of the brake cylinder so as to control a supply of working fluid to the first chamber and a second valve provided in fluid communication with the second chamber of the brake cylinder so as to control a supply of the working fluid to the second chamber. By adjusting a position of at least one of the first valve or the second valve, the movement of the piston rod may be regulated so as to control a braking force applied between the brake assembly and a drum of the draw works.

In another aspect, the present subject matter is directed to a braking system for a draw works used in connection with a drilling rig. The braking system may include a brake assembly having a rotatable brake shaft, with the shaft including a shaft flange. The system may also include a brake lever mechanically coupled to the brake shaft and a brake cylinder having a piston and a piston rod extending outwardly from the piston. In addition, the system may include an actuator coupled between the piston rod and the brake shaft. The actuator may include an actuator lip extending outwardly therefrom. Moreover, the actuator may be coupled around the brake shaft such that the brake shaft is rotatable relative to the actuator when the actuator lip is not engaged against the shaft flange. Further, when the actuator lip is engaged against the shaft flange, movement of the piston rod may result in rotation of the brake shaft.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
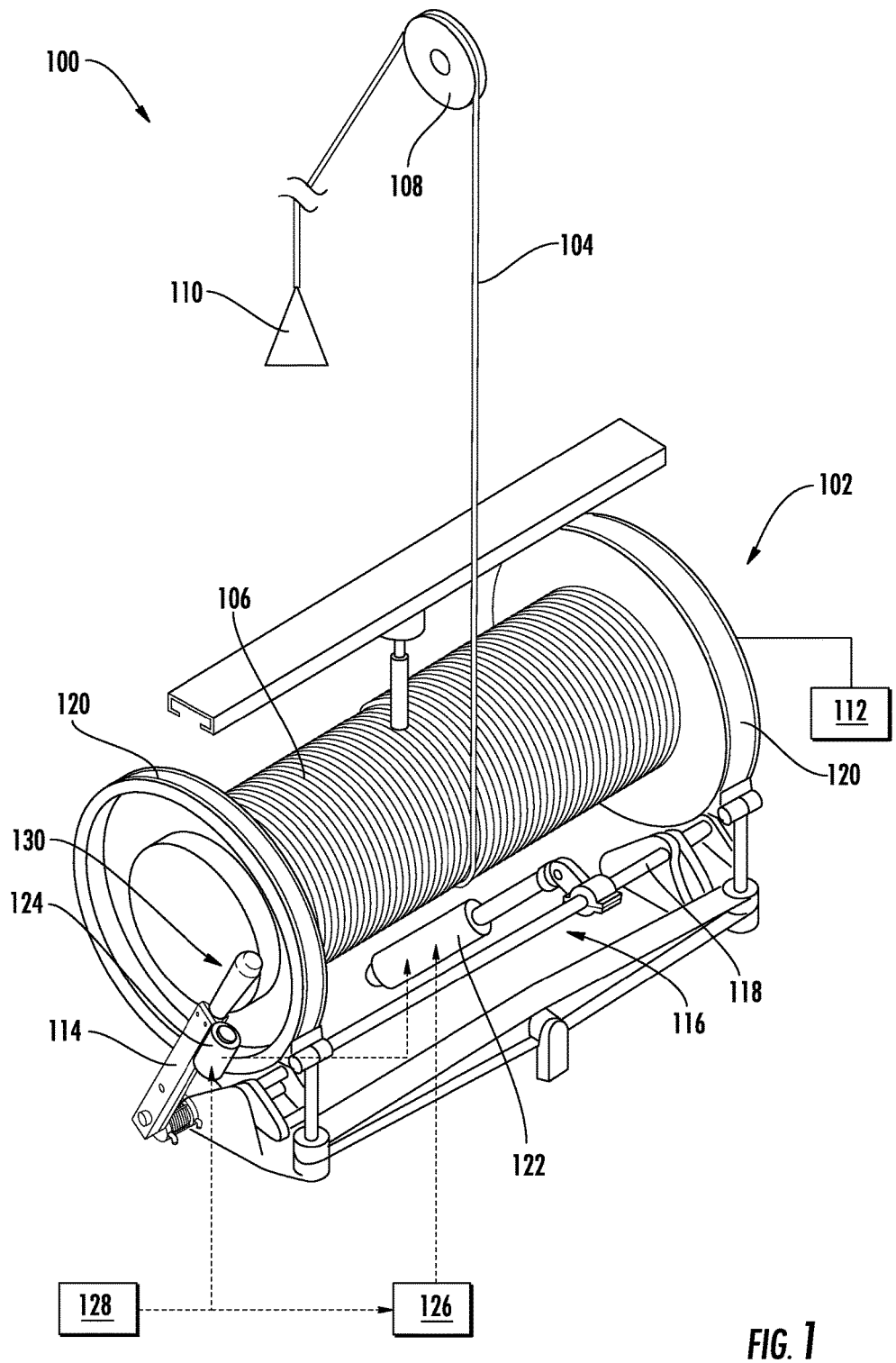
FIG. 1 illustrates a functional diagram of one embodiment of a braking system configured for use with a draw works of a drilling rig in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to an improved braking system for a draw works used in connection with a drilling rig for performing drilling operations. Specifically, in several embodiments, the braking system may include a handle/valve assembly configured to allow an operator to pneumatically apply the brake for the draw works. In a particular embodiment, the handle/valve assembly may include a handle coupled to the brake lever of the draw works and a handle valve movable between an opened position and a closed position based on the position of the handle. The handle valve may be configured to control the supply of a working fluid (e.g., air) to a brake cylinder mechanically coupled to a brake shaft of the draw works brake assembly. Thus, by simply moving the handle one way or the other so as to control the position of the handle valve, the braking force between the brake and the draw works may be increased or decreased, thereby allowing the operator to precisely control the operation of the brake and, thus, the operation of the draw works. Moreover, the ease of use provided by the pneumatic handle assembly may allow for reduced operator fatigue as opposed to the manual braking process required by the brake lever.

Additionally, the system may also include a park valve movable between an opened position and a closed position so as to control a supply of working fluid to the brake cylinder. For instance, in several embodiments the park valve may correspond to a manually operated valve that provides emergency/park brake functionality to the disclosed system. Specifically, when the operator desires to immediately engage/disengage the brake, he/she may simply open or close the park valve (e.g., via a knob associated with the valve), thereby opening or closing the supply of working fluid to the brake cylinder. As such, when the park valve is moved to its position associated with engaging the brake, the brake assembly may be pneumatically applied via the brake cylinder, which may allow the brake to continue to be applied even if one or more of the brake assembly components subsequently contract due to cooling.

Moreover, as will be described below, the brake cylinder may, in several embodiments, be configured to be rotatably coupled to the brake shaft of the brake assembly via a non-rigid, rotatable connection. Thus, the brake shaft may be configured to rotate relative to the actuator and vice versa when such components are not otherwise rotationally engaged. This may allow the manual brake lever to be used if necessary or desired, to rotate the brake shaft independent of the brake cylinder, which may be advantageous if one or more system/brake components have become misaligned or were not properly installed.

Referring now to FIG. 1, a functional diagram of one embodiment of a braking system 100 to be used in connection with a drilling rig is illustrated in accordance with aspects of the present subject matter. As shown, the system 100 is installed onto or otherwise incorporated into a hoist or draw works 102, such as one that may be used on a drilling rig for performing drilling operations. In general, the draw works 102 may include a drill line 104 wound around a large spool or drum 106. The drill line 104 extends from the drum 106 through a pulley 108 or other block and tackle arrangement to a traveling block 110. A drive system 112 is typically mechanically connected to the drum 106 to rotate the drum 106 in a manner that reels in or unwinds the drill line 104.

Additionally, as shown in FIG. 1, the draw works 102 may include a brake lever 114 configured to be manually operated so to apply or release a brake associated with a brake assembly 116 connected to the drum 106. The brake assembly 116 may include, for example, a brake shaft 118 that is mechanically coupled to the brake lever 114. The brake shaft 118 may, in turn, be mechanically coupled to a brake pad and/or any other component (not shown in FIG. 1) that is configured to engage a strap(s) 120 looped over one or both ends of the drum 106. As such, by manually rotating the brake lever 114, an operator may loosen or tighten the friction between the strap 120 and the drum 106 so as to manually control the brake force applied to the drum 106. For example, in the particular embodiment shown in FIG. 1, the lever 114 may be manually lifted or rotated counterclockwise to loosen the strap 120 around the drum 106 to allow the drive system 112 to rotate the drum 106 to reel in the drill line 104 and raise the travelling block 110. Alternately, the drive system 112 may be disengaged from the drum 106 and the lever 114 may be manually lifted or rotated counterclockwise to loosen the strap 120 around the drum 106 to allow the weight of the travelling block 110 to rotate the drum 106 to release the drill line 104 from the drum 106 and lower the travelling block 110. When the travelling block 110 is at the desired position, the lever 114 may be manually pushed down or rotated clockwise to tighten the strap 120 around the drum 106 to stop further movement of the travelling block 110.

In several embodiments, the disclosed system 100 may include various components that allow the components of the brake assembly 116 to be pneumatically applied as opposed to the manual application of the brake provided by the brake lever 114. For example, as shown in FIG. 1, the system 100 may include a pneumatic brake cylinder 122 mechanically coupled to the brake shaft 118. As such, by actuating or retracting the cylinder's piston rod, the brake shaft 118 may be rotated clockwise or counterclockwise, thereby allowing the brake assembly to be engaged or disengaged.

To actuate or retract the piston rod, the system 100 may include one or more valves 124, 126 configured to control a supply of working fluid (e.g., air) provided to the brake cylinder 122 from a fluid source 128 (e.g., an air supply). Specifically, as shown in FIG. 1, the system 100 may include a first valve 124 provided in fluid communication between the fluid source 128 and the brake cylinder 122. As will be described below, the first valve 124 may, in several embodiments, form part of a handle/valve assembly 130 configured to be mounted to or otherwise supported by the brake lever 114. In such embodiments, the handle/valve assembly 130 may include a manually actuated handle that is coupled to the first valve 124 such that, as the handle is moved by the operator, the first valve 124 may be opened or closed to regulate the amount of working fluid supplied to a first chamber of the brake cylinder 122. As such, the operator may be able to precisely control the application of the brake via controlled movements of the handle. For example, the handle/valve assembly 130 may allow the operator to gradually engage or gradually release the brake independent of the brake lever 114.

Additionally, as shown in FIG. 1, the system 100 may also include a second valve 126 provided in fluid communication between the fluid source 128 and the brake cylinder 122. In several embodiments, the second valve 126 may be configured to provide emergency/park brake functionality for the disclosed system 100. Specifically, in one embodiment, the second valve 126 may correspond to a manually operated valve that may be opened/closed by the operator to allow the brake to be pneumatically applied/released. For instance, as will be described below, an operator may pull a valve knob associated with the second valve 126 in one direction to provide a supply of working fluid to a second chamber of the brake cylinder 122, thereby causing the cylinder 122 to disengage the brake. Similarly, the operator may pull the valve knob in the opposite direction to cut-off the supply of working fluid to the second chamber of the brake cylinder 122, thereby causing the cylinder 122 to engage the brake.

Figure 2:
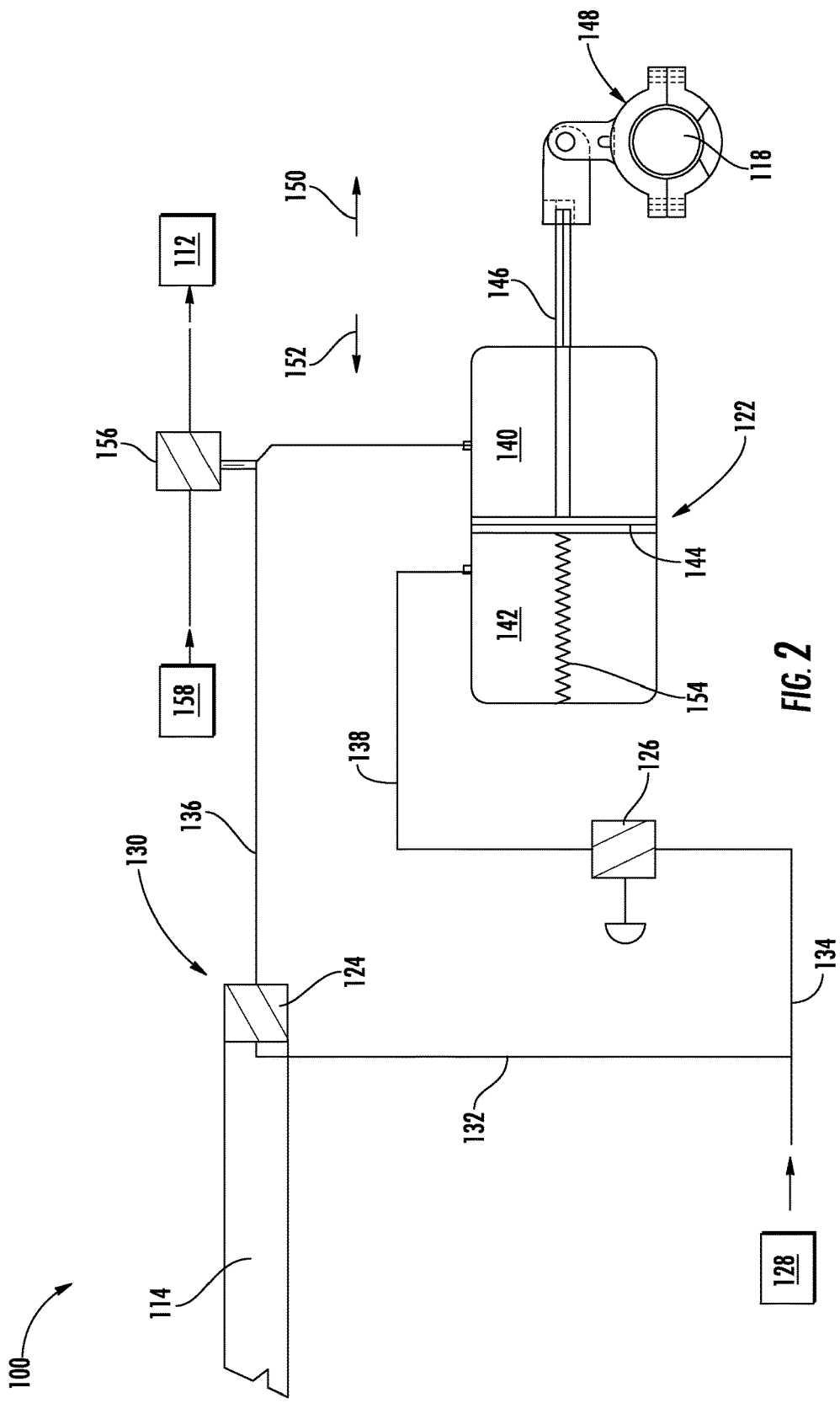
FIG. 2 illustrates a schematic view of one embodiment of various components that may be included within the braking system shown in FIG. 1 in accordance with aspects of the present subject matter.

Referring now to FIG. 2, a schematic view of various components that may be included within one embodiment of the system 100 described above with reference to FIG. 1 is illustrated in accordance with aspects of the present subject matter. As indicated above, the first and second valves 124, 126 of the disclosed system 100 may be provided in fluid communication between the fluid source 128 and the brake cylinder 122, thereby allowing each valve 124, 126 to regulate or control the supply of working fluid to the cylinder 122. For example, as shown in FIG. 2, a first valve supply line or conduit 132 may extend between the fluid source 128 and the first valve 124 and a second valve supply line or conduit 134 may extend between the fluid source 128 and the second valve 126. Additionally, a first cylinder supply line or conduit 136 may be coupled between the first valve 124 and a first chamber 140 of the brake cylinder 122 and a second cylinder supply line or conduit 138 may be coupled between the second valve 126 and a second chamber 142 of the brake cylinder 122. Thus, by controlling the operation of the first valve 124, the supply or pressure of the operatizing fluid directed from the first valve 124 to the first chamber 140 of the brake cylinder 122 (e.g., via the first cylinder supply line 136) may be regulated. Similarly, by controlling the operation of the second valve 126, the supply or pressure of the operatizing fluid directed from the second valve 126 to the second chamber 142 of the brake cylinder 122 (e.g., via the second cylinder supply line 138) may be regulated.

As shown in FIG. 2, the brake cylinder 122 may include a piston 144 and a piston rod 146 extending outwardly therefrom, with the piston 144 being positioned between the cylinder's first and second chambers 140, 142. The piston rod 146 is, in turn, coupled to the brake shaft 118 via an actuator 148. As will be described below, the actuator 148 may, in several embodiments, be configured to be clamped or otherwise installed around the brake shaft 118 in a manner that allows the brake shaft 118 to be rotated relative to the actuator 148 and vice versa in certain instances. In such embodiments, the actuator 148 may be configured to rotationally engage the brake shaft 118 via contact with a stop or flange secured to the shaft 118.

By mechanically coupling the piston rod 146 to the brake shaft 118 (e.g., via rotational engagement between the actuator 148 and the shaft 118), actuation/retraction of the rod 146 (via movement of the piston 144) may, in turn, rotate the brake shaft 118, thereby increasing or decreasing the braking force applied between the brake assembly 116 and the drum 106. For example, in one embodiment, actuation of the piston rod 146 in a first direction (indicated by arrow 150) may rotate the brake shaft 118 in a clockwise direction so as to release or disengage the brake while retraction of the rod 146 in a second direction (indicated by arrow 152) may rotate the brake shaft in a counter-clockwise direction, thereby applying or engaging the brake. In such an embodiment, the controlled supply of working fluid to the first chamber 140 and/or the second chamber 142 of the brake cylinder 122 may allow for the piston rod 146 to be actuated or retracted, as desired. For instance, by opening the first valve 124 (while the second valve 126 is closed) and supplying working fluid to the first chamber 140 of the brake cylinder 122, the piston 144 may be pushed in the second direction 152, thereby retracting the piston rod 146 inwardly and applying the brake. Similarly, by opening the second valve 126 and supplying working fluid to the second chamber 142 of the brake cylinder 122, the piston 144 may be pushed in the first direction 150, thereby actuating the piston rod 146 outwardly and releasing the brake.

As indicated above, in several embodiments, the second valve 126 may function as an emergency/park brake valve. As such, during normal operation, the second valve 126 may be in an opened position to allow operating fluid to be supplied to the second chamber 142, which pressurizes the second chamber 142 and forces the piston 144 in the first direction 150. Accordingly, to apply the brake, the first valve 126 may be opened to supply operating fluid to the first chamber 140, thereby increasing the fluid pressure within the first chamber 140. When the fluid pressure in the first chamber 140 is increased above the fluid pressure in the second chamber 142, the piston 144 may be moved in the second direction 152, thereby applying the brake. Thus, by gradually increasing or decreasing the pressure within the first chamber 140, the brake may be gradually applied or released, respectively.

Additionally, as shown in FIG. 2, in one embodiment, the brake cylinder 122 may include a spring 154 or biasing mechanism that biases the piston 144 in the second direction 152. As such, if there is a total loss of working fluid within the system 100, the piston 144 may be pulled or pushed in the second direction 152, thereby retracting the piston rod 146 inwardly and applying the brake.

Moreover, as shown in FIG. 2, the system 100 may, in one embodiment, include a normally opened relay valve 156 provided in fluid communication between the first valve 124 and the brake cylinder 122 along the first cylinder supply line 136. When the relay valve 156 is in the open position, working fluid from a fluid source 158 (which may be the same as fluid source 128 or a different fluid source) is directed through to the valve 156 to the drive system 112 for driving the spool 106. However, in the event that the emergency/park brake is to be engaged (e.g., upon closing the second valve 126), the relay valve 156 may be closed to cut-off the supply of working fluid to the drive system 112.

Figure 3:
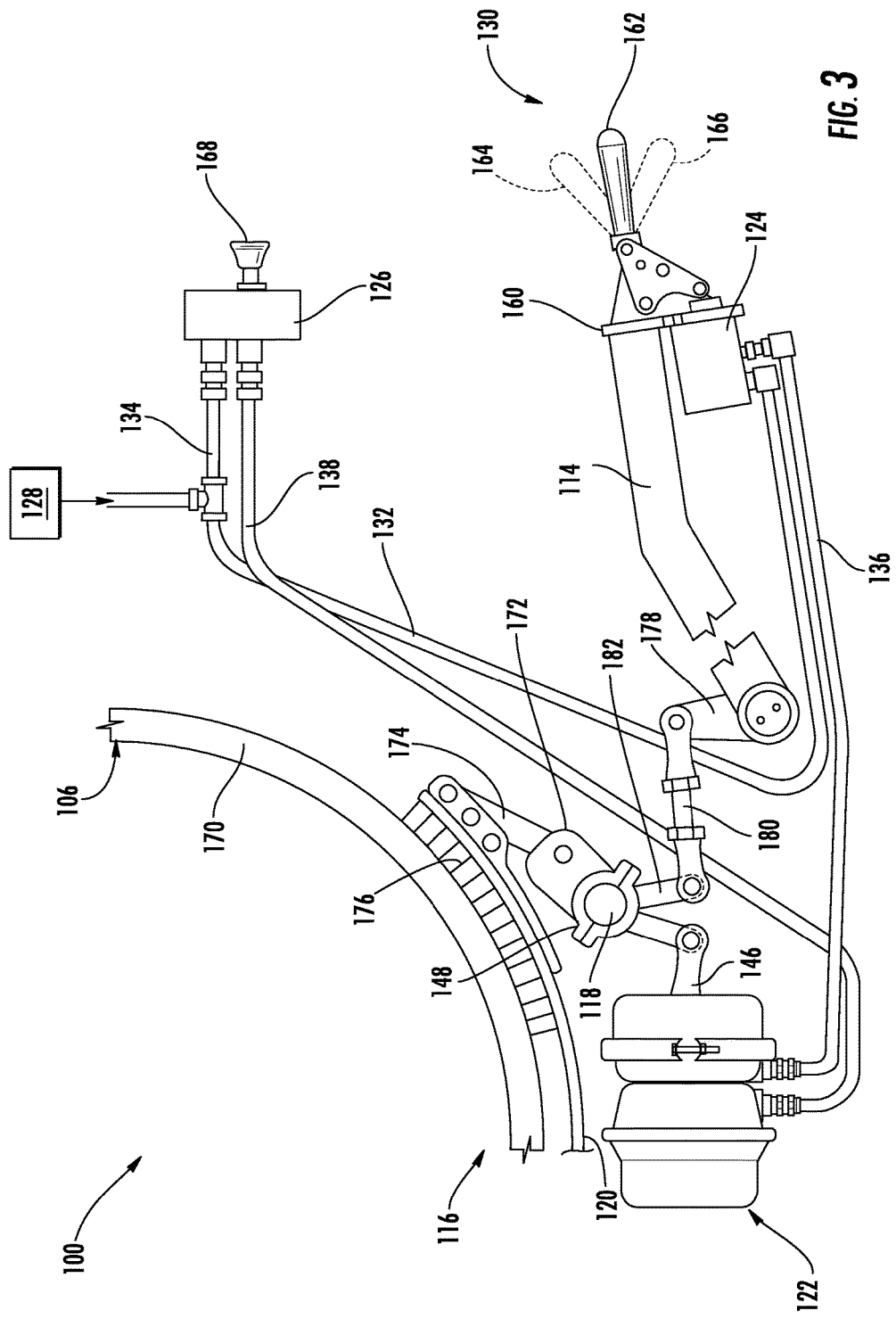
FIG. 3 illustrates a more detailed, schematic view of one embodiment of various components that may be included within the braking system shown in FIG. 1 in accordance with aspects of the present subject matter.

Referring now to FIG. 3, a more detailed schematic view of various components that may be included within one embodiment of the system 100 described above with reference to FIG. 1 is illustrated in accordance with aspects of the present subject matter, particularly illustrating an embodiment of various configurations of the system components and an embodiment of various connections that may be made between the system components and the components of the draw works brake assembly 116. As shown in FIG. 3 and as described above, the fluid source 128 may be coupled to the first valve 124 via a first valve supply line 132 and to the second 126 valve via a second valve supply line 134, with the first and second valves 124, 126 being fluidly coupled to the brake cylinder 122 via the first and second cylinder supply lines 136, 138, respectively.

As indicated above, in several embodiments, the first valve may be integrated into or form part of a handle/valve assembly 130 configured to be mounted to or otherwise supported by the brake lever 114. Specifically, as shown in FIG. 3, the handle assembly 130 may include a handle flange 160 mounted to the end of the brake lever 114 (e.g., via welding) and an actuatable handle 162 supported relative to the brake lever 114 by the flange 160. The handle 162 may, in turn, be coupled to the first valve 124 such that, as the handle 162 is pivoted relative to the flange 160 between a first position (indicated by dashed lines 164) and a second position (indicated by dashed lines 166), the first valve 124 is moved between opened and closed positions. As such, the pressure of the working fluid supplied to the first chamber 140 of the brake cylinder 122 may be carefully regulated by controlling the position of the handle 162, thereby allowing the operator to precisely control the application of the brake.

It should be appreciated that, although the embodiment illustrated in FIG. 3 shows the handle assembly 130 being coupled to the brake lever 114 at its end, the various components of the handle assembly 130 may, in alternative embodiments, be coupled to the brake lever 114 at any other suitable location(s). For instance, in another embodiment, the handle 162 and/or the first valve 124 may be coupled to the top or bottom of the lever 114 or to one of the sides of the lever 114.

Additionally, as shown in FIG. 3, the second valve 126 may include a valve knob 168 configured to be pushed or pulled between a first position (as shown in solid lines in FIG. 3) and a second position (as indicated by the dashed lines shown in FIG. 3). When the valve knob 168 is pushed to the first position, the second valve 126 is moved to a closed position so as to cut-off of the supply of working fluid to the second chamber 142 of the brake cylinder 122, thereby engaging the brake. Similarly, when the valve knob 168 is pulled outwardly to the second position, the second valve 126 is moved to an opened position to allow working fluid to be supplied to the second chamber 142 of the brake cylinder 122, thereby releasing the brake.

As indicated above, the brake assembly 116 of the draw works 102 may include a strap(s) 120 configured to be loosened or tightened around the drum 106 so as to control the braking force applied to the drum 106. As shown in FIG. 3, the strap 120 may be wrapped around a brake flange 170 of the drum 106 and may be coupled to the brake shaft 118 via a crank/bar arrangement. Specifically, a bell crank 172 may be coupled to the brake shaft 118, with a toggle bar 174 being coupled between the bell crank 172 and the strap 120. As such, when the brake shaft 118 is rotated in one direction, the crank/bar arrangement may be actuated in a manner that tightens the strap 120 around the brake flange 170 (e.g., by pushing or piffling the strap 120 tightly against a brake block or pad 176 coupled to the exterior of the brake flange 170), thereby increasing the braking force on the drum 106. Similarly, when the brake shaft 118 is rotated in the opposite direction, the crank/bar arrangement may be actuated in a manner that loosens the strap 120 around the brake flange 170, thereby decreasing the braking force on the drum 106.

Moreover, as indicated above, rotation of the brake shaft 118 may be achieved pneumatically via the brake cylinder 122 or manually via the brake lever 114. Specifically, as shown in FIG. 3, the piston rod 146 of the brake cylinder 122 is coupled to the brake shaft 118 via the disclosed actuator 148. Thus, when the piston rod 146 is actuated or retracted, the brake shaft 118 may be rotated to allow the braking force applied to the drum 106 to be increased or decreased. Similarly, as shown in FIG. 3, the brake lever 114 is mechanically coupled to the brake shaft 118 via one or more linkages (e.g. a first crank 178, a linkage bar 180 and a second crank 182) that are separate from the actuator 148. As such, when the brake lever 114 is rotated clockwise or counter-clockwise, the brake shaft 118 may be similarly rotated to allow the braking force applied to the drum 106 to be increased or decreased.

Figure 4:
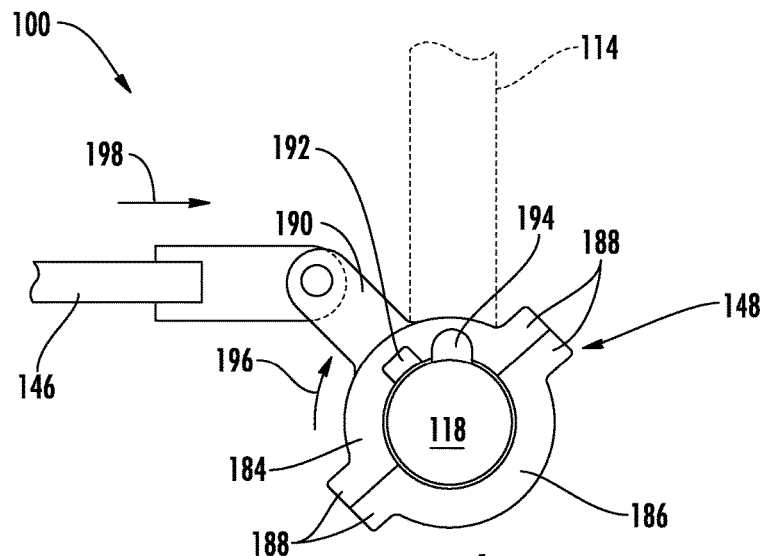
FIG. 4 illustrates a side view of one embodiment of a suitable rotatable interface defined between an actuator and a brake shaft of the disclosed system in accordance with aspects of the present subject matter, particularly illustrating the actuator being rotated relative to the brake shaft prior to an actuator lip of the actuator contacting or engaging a shaft flange of the brake shaft.
Figure 5:
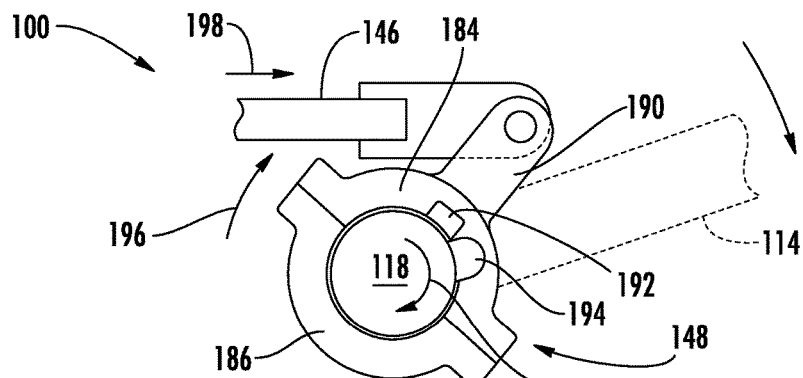
FIG. 5 illustrates another side view of the components shown in FIG. 4, particularly illustrating the brake shaft rotating with the actuator due to the engagement between the actuator lip and the shaft flange.
Figure 6:
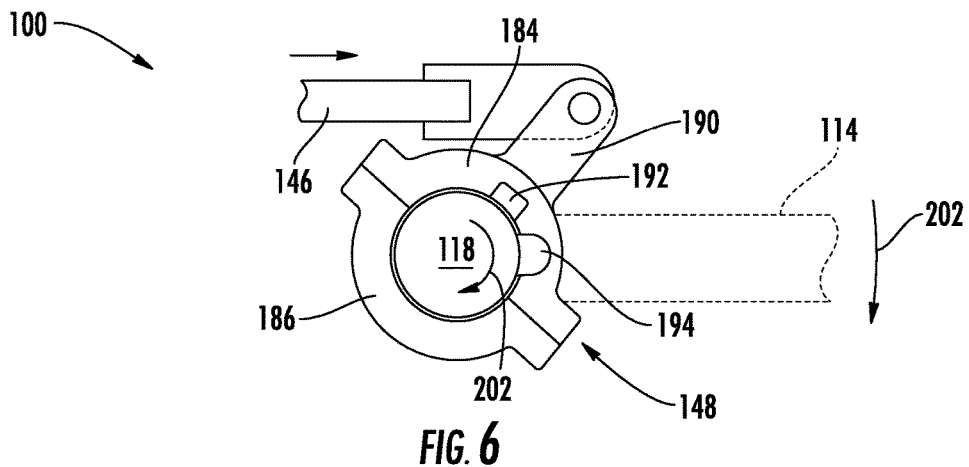
FIG. 6 illustrates yet another side view of the components shown in FIG. 4, particularly illustrating the brake shaft being rotated relative to the actuator via a brake lever of the disclosed system.

Referring now to FIGS. 4-6, various views of one embodiment of the interface provided between the actuator 148 of the brake cylinder 122 and the brake shaft 118 are illustrated in accordance with aspects of the present subject matter. As shown in FIGS. 4-6, the actuator 148 may, in several embodiments, correspond to a two-piece construction that is configured to be assembled or coupled around the brake shaft 118. Specifically, the actuator may include a first actuator member 184 configured to be coupled to a second actuator member 186 (e.g., via mechanical fasteners or welding) at corresponding flanges 188 extending outwardly from the ends of each actuator member 184, 186 such that, when the actuator members 184, 186 are assembled around the brake shaft 118, the actuator 148 full encircles a portion of the brake shaft 118. As shown in FIGS. 4-6, an actuator arm 190 may be coupled to the first actuator member 184 (or the second actuator member 186) to provide a mechanical linkage between the actuator 148 and the piston rod 146 of the brake cylinder 122.

By providing a rotatable connection or interface between the actuator 148 and the brake shaft 118 (as opposed to rigidly coupling the actuator 148 to the shaft 118), the brake shaft 118 may be configured to rotate relative to the actuator 148 and vice versa. For instance, a non-friction fit may be provided between the brake shaft 118 and the actuator 148, such as by providing some amount of tolerance between the inner circumference of the actuator 148 and the outer circumference of the brake shaft 118. As such, the brake shaft 118 may, when desired, be rotated independent of the actuator 148 (e.g., by manually rotating the brake shaft 118 via the brake lever 114).

Additionally, as shown in FIGS. 4-6, to allow the actuator 148 to rotationally engage the brake shaft 118, the actuator may include a flange or lip 192 extending outwardly therefrom (e.g., from the first actuator member) that is configured to engage a corresponding shaft flange 194 extending outwardly from the shaft 118. Thus, when the actuator lip 192 contacts or otherwise engages the shaft flange 194, such engagement may allow the actuator 148 to rotationally engage the brake shaft 119, thereby providing a means to rotate the brake shaft 118 via actuation and/or retraction of the piston rod 146 of the brake cylinder 122. For example, as shown in FIG. 4, prior to the actuator lip 192 contacting or engaging the shaft flange 194, the actuator 148 may be configured to rotate relative to the brake shaft 118 (as indicated by arrow 196) as the piston rod 146 is being actuated (as indicated by arrow 198). By continuing to rotate the actuator 148 relative to the brake shaft 118, the actuator lip 192 may rotationally engage the shaft flange 194, thereby allowing the rotation of the actuator 148 to be transferred to the brake shaft 118. For example, as shown in FIG. 5, the actuator 148 has been rotated such that the actuator lip 192 and the shaft flange 194 are engaged. Thus, as the actuator 148 is rotated (e.g., as indicated by arrow 196 in FIG. 5) via actuation of the piston rod 146 (as indicated by arrow 198 in FIG. 5), the brake shaft 118 is similarly/rotated in the same direction as the actuator 148 (as indicated by arrow 200 in FIG. 5).

It should be appreciated by those of ordinary skill in the art that, by providing a connection between the actuator 148 and the brake shaft 118 that allows relative rotation between such components, the brake shaft 118 may be rotated without requiring actuation or retraction of the position rod 146, thereby allowing the brake shaft 118 to be de-coupled the brake cylinder 122. For example, if the brake cylinder 122 is malfunctioning or if components of the braking system 100 are misaligned or haven been improperly installed, the brake shaft 118 may need to be rotated beyond the extent provided via the brake cylinder/actuator assembly to allow the brake to be properly engaged or disengaged. In such instance, the brake lever 114 may be manually rotated to provide further rotation of the brake shaft 118. For instance, in the example view shown in FIG. 6, the actuator 148 is illustrated at the same rotational position as that shown in FIG. 5 (which may, for example, correspond to the position of the actuator 148 when the piston rod 146 has been actuated to full stroke). As shown in FIG. 6, since the actuator 148 is not rigidly coupled to the brake shaft 118, the brake lever 114 may be used to manually rotate the brake shaft 118 relative to the actuator (as indicated by arrows 202) to allow the brake to be further engaged or disengaged.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A braking system for a draw works used in connection with a drilling rig, the braking system comprising:
    a brake assembly including a rotatable brake shaft;
    a brake lever mechanically coupled to the brake shaft, the brake lever configured to be rotated so as to rotate the brake shaft;
    a brake cylinder including a first chamber, a second chamber and a piston positioned between the first and second chambers, the brake cylinder further including a piston rod extending outwardly from the piston, the piston rod configured to be mechanically coupled to the brake shaft such that movement of the piston rod results in rotation of the brake shaft;
    a first valve provided in fluid communication with the first chamber of the brake cylinder so as to control a supply of working fluid to the first chamber; and
    a second valve provided in fluid communication with the second chamber of the brake cylinder so as to control a supply of the working fluid to the second chamber, wherein, by adjusting a position of at least one of the first valve or the second valve, the movement of the piston rod is regulated so as to control a braking force applied between the brake assembly and a drum of the draw works.

2. The braking system of claim 1, wherein the first valve forms part of a handle/valve assembly provided in operative association with the brake lever, the handle/valve assembly including a handle coupled to the first valve so as to allow manual control of the supply of the working fluid to the first chamber.

3. The braking system of claim 2, wherein the handle is mounted to a portion of the brake lever.

4. The braking system of claim 1, wherein the second valve is movable between an opened position to allow the supply of the working fluid to be provided to the second chamber and a closed position to cut-off the supply of the working fluid to the second chamber, wherein the brake cylinder is configured to increase the braking force between the brake assembly and the drum when the second valve is moved to the closed position.

5. The braking system of claim 4, wherein the second valve includes a manually operated knob that is configured to be moved in order to transition the second valve between the opened position and the closed position.

6. The braking system of claim 4, wherein, when the second valve is moved to the opened position, the braking force applied between the brake assembly and the drum is controlled at least partially by regulating the supply of the working fluid to the first chamber via the first valve.

7. The braking system of claim 4, wherein the brake cylinder includes a spring configured to bias the piston into a position that engages the brake assembly.

8. The braking system of claim 1, wherein the piston rod is coupled to the brake shaft via an actuator, the actuator being coupled around the brake shaft such that the brake shaft is rotatable relative to the actuator.

9. The braking system of claim 8, wherein the actuator includes an actuator lip configured to contact a shaft flange extending outwardly from the brake shaft so as to rotationally engage the actuator with the brake shaft.

10. The braking system of claim 8, wherein the actuator includes a first actuator member and a second actuator member, the first and second actuator members being coupled to one another around the outer circumference of the brake shaft such that the actuator encircles a portion of the brake shaft, the actuator further comprising an actuator arm coupled between the piston rod and one of the first actuator member or the second actuator member.

11. The braking system of claim 1, wherein the brake lever is mechanically coupled to the brake shaft via a different linkage than the brake cylinder.

12. A braking system for a draw works used in connection with a drilling rig, the braking system comprising:
    a brake assembly including a rotatable brake shaft, the brake shaft including a shaft flange;
    a brake lever mechanically coupled to the brake shaft, the brake lever configured to be rotated so as to rotate the brake shaft;
    a brake cylinder including a piston and a piston rod extending outwardly from the piston;
    an actuator coupled between the piston rod and the brake shaft, the actuator including an actuator lip extending outwardly therefrom, the actuator being coupled around the brake shaft such that the brake shaft is rotatable relative to the actuator when the actuator lip is not engaged against the shaft flange, wherein, when the actuator lip is engaged against the shaft flange, movement of the piston rod results in rotation of the brake shaft;

a first valve provided in fluid communication with a first chamber of the brake cylinder so as to control a supply of working fluid to the first chamber, wherein, by adjusting a position of the first valve when the actuator lip is engaged against the shaft flange, the movement of the piston rod is regulated so as to control a braking force applied between the brake assembly and a drum of the draw works; and a second valve provided in fluid communication with a second chamber of the brake cylinder so as to control a supply of the working fluid to the second chamber.

13. The braking system of claim 12, wherein the first valve forms part of a handle/valve assembly provided in operative association with the brake lever, the handle/valve assembly including a handle coupled to the first valve so as to allow manual control of the supply of the working fluid to the first chamber.

14. The braking system of claim 12, wherein the second valve is movable between an opened position to allow the supply of the working fluid to be provided to the second chamber and a closed position to cut-off the supply of the working fluid to the second chamber, wherein the brake cylinder is configured to increase the braking force between the brake assembly and the drum when the second valve is moved to the closed position.

15. The braking system of claim 14, wherein, when the second valve is moved to the opened position, the braking force applied between the brake assembly and the drum is controlled at least partially by regulating the supply of working fluid to the first chamber via the first valve.

16. The braking system of claim 12, wherein the actuator includes a first actuator member and a second actuator member, the first and second actuator members being coupled to one another around the outer circumference of the brake shaft such that the actuator encircles a portion of the brake shaft.

17. The braking system of claim 16, wherein the actuator further comprises an actuator arm coupled between the piston rod and one of the first actuator member or the second actuator member.

18. The braking system of claim 12, wherein the brake lever is mechanically coupled to the brake shaft via a linkage separate from the actuator.

* * * * *